US008725488B2

(12) United States Patent  (10) Patent No.: US 8,725,488 B2
Hofmann et al.  (45) Date of Patent: May 13, 2014

(54) METHOD AND APPARATUS FOR ADAPTIVE VOLTAGE SCALING BASED ON INSTRUCTION USAGE

(75) Inventors: Richard Gerard Hofmann, Cary, NC (US); Jeffrey Todd Bridges, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1167 days.

(21) Appl. No.: 11/828,782

(22) Filed: Jul. 26, 2007

(65) Prior Publication Data

US 2009/0031155 A1  Jan. 29, 2009

(51) Int. Cl.
*G06F 9/455* (2006.01)
*G06F 1/26* (2006.01)
*G06F 1/32* (2006.01)

(52) U.S. Cl.
CPC .............. *G06F 1/324* (2013.01); *G06F 1/3203* (2013.01); *G06F 1/3296* (2013.01); *Y02B 60/1285* (2013.01)
USPC ............................................ 703/23; 713/321

(58) Field of Classification Search
CPC ..... G06F 1/324; G06F 1/3203; G06F 1/3296; Y02B 60/1285
USPC .......................................... 703/23; 713/321
See application file for complete search history.

(56) References Cited

U.S. PATENT DOCUMENTS

| | | |
|---|---|---|
| 5,218,704 A | 6/1993 | Watts, Jr. |
| 5,230,055 A | 7/1993 | Katz |
| 5,511,203 A | 4/1996 | Wisor |
| 5,572,719 A | 11/1996 | Biesterfeldt |
| 5,682,093 A | 10/1997 | Kivela |
| 5,692,204 A | 11/1997 | Rawson |
| 5,717,319 A | 2/1998 | Jokinen |
| 5,719,800 A | 2/1998 | Mittal |
| 5,745,375 A | 4/1998 | Reinhardt |
| 5,754,869 A | 5/1998 | Holzhammer |
| 5,757,171 A | 5/1998 | Babcock |
| 5,781,783 A | 7/1998 | Gunther |
| 5,812,860 A | 9/1998 | Horden et al. |
| 5,815,724 A | 9/1998 | Mates |
| 5,825,674 A | 10/1998 | Jackson |
| 5,832,284 A | 11/1998 | Michail |
| 5,894,577 A | 4/1999 | MacDonald |
| 5,914,996 A | 6/1999 | Huang |
| 5,923,545 A | 7/1999 | Nguyen |
| 5,940,785 A | 8/1999 | Georgiou |
| 5,996,084 A | 11/1999 | Watts |
| 6,021,500 A | 2/2000 | Wang |
| 6,047,248 A | 4/2000 | Georgiou |
| 6,118,306 A | 9/2000 | Orton |
| 6,119,241 A | 9/2000 | Michail |
| 6,272,642 B2 | 8/2001 | Pole, II |
| 6,313,622 B1 | 11/2001 | Seki et al. |
| 6,347,379 B1 | 2/2002 | Dai |
| 6,366,157 B1 * | 4/2002 | Abdesselem et al. ......... 327/535 |
| 6,414,527 B1 | 7/2002 | Seno et al. |
| 6,415,388 B1 | 7/2002 | Browning |
| 6,425,086 B1 | 7/2002 | Clark |
| 6,427,211 B2 | 7/2002 | Watts, Jr. |
| 6,442,746 B1 | 8/2002 | James |
| 6,457,135 B1 | 9/2002 | Cooper |
| 6,477,654 B1 | 11/2002 | Dean |
| 6,513,124 B1 | 1/2003 | Furuichi |
| 6,535,735 B2 | 3/2003 | Underbrink et al. |
| 6,825,711 B2 | 11/2004 | Cohn et al. |
| 7,100,061 B2 | 8/2006 | Halepete |
| 7,205,805 B1 | 4/2007 | Bennett |
| 7,239,494 B2 * | 7/2007 | Naffziger ...................... 361/91.1 |
| 7,257,723 B2 * | 8/2007 | Galles .......................... 713/321 |

| | | | | |
|---|---|---|---|---|
| 7,276,925 | B2* | 10/2007 | Dobberpuhl et al. | 324/763 |
| 7,417,482 | B2 | 8/2008 | Elgebaly et al. | |
| 7,506,189 | B1* | 3/2009 | Lee et al. | 713/322 |
| 7,652,494 | B2* | 1/2010 | Dobberpuhl et al. | 324/750.3 |
| 7,809,932 | B1* | 10/2010 | Barry et al. | 712/229 |
| 8,046,601 | B1* | 10/2011 | Paz et al. | 713/300 |
| 2002/0190283 | A1* | 12/2002 | Seno et al. | 257/275 |
| 2005/0060597 | A1* | 3/2005 | Albonesi et al. | 713/600 |
| 2005/0062507 | A1* | 3/2005 | Naffziger et al. | 327/105 |
| 2005/0251700 | A1* | 11/2005 | Henderson et al. | 713/401 |
| 2005/0283630 | A1* | 12/2005 | Shikata | 713/322 |
| 2007/0001697 | A1* | 1/2007 | Dobberpuhl et al. | 324/763 |
| 2007/0096775 | A1* | 5/2007 | Elgebaly et al. | 327/105 |
| 2007/0229054 | A1* | 10/2007 | Dobberpuhl et al. | 324/76.11 |

FOREIGN PATENT DOCUMENTS

| | | |
|---|---|---|
| EP | 0501655 | 2/1992 |
| JP | 2000216338 A | 8/2000 |
| JP | 2000295084 A | 10/2000 |
| JP | 2001505676 A | 4/2001 |
| WO | 01/27728 | 4/2001 |
| WO | 2006073845 | 7/2006 |
| WO | WO2009015326 A2 | 1/2009 |

OTHER PUBLICATIONS

Eric Tune, Dongning Liang, Dean M. Tullsen, Brad Calder, "Dynamic Prediction of Critical Path Instructions", Jan. 2001, In Proceedings of the 7th International Symposium on High Performance Computer Architecture.*

Masakatsu Nakai, Satoshi Akui, Katsunori Seno, Tetsumasa Meguro, Takahiro Seki, Tetsuo Kondo, Akihiko Hashiguchi, Hirokazu Kawahara, Kazuo Kumano, and Masayuki Shimura, "Dynamic Voltage and Frequency Management for a Low-Power Embedded Microprocessor", Jan. 2005, IEEE Journal of Solid-State Circuits, vol. 40, No. 1.*

Mohamed Elgebaly, NPL, "Efficient Adaptive voltage scaling system through on-chip critical path emulation", 2004.*

Ivan Matosevic, NPL, "Power Optimizations for the MLCA Using Dynamic Voltage Scaling", 2005.*

Ivan Matosevic, NPL, "Power Optimizations for the MLCA Using Dynamic Voltage Scaling", Thesis, 2006.*

International Search Report—PCT/US08/071155, International Search Auhtority—European Patent Office—Jul. 6, 2009.

Written Opinion—PCT/US08/07155, International Search Authority—European Patent Office—Jul. 6, 2009.

* cited by examiner

*Primary Examiner* — Omar Fernandez Rivas
*Assistant Examiner* — Angel Calle
(74) *Attorney, Agent, or Firm* — Nicholas J. Pauley; Peter Michael Kamarchik; Joseph Agusta

(57) ABSTRACT

Different software applications may use a set of instructions having critical timing paths less than a worst case critical timing path of a processor complex. For such applications, a supply voltage may be reduced while still maintaining the clock frequency necessary to meet the application's performance requirements. In order to reduce the supply voltage, an adaptive voltage scaling method is used. A critical path is selected from a plurality of critical paths for analysis on emulation logic to determine an attribute of the selected critical path during on chip functional operations. The selected critical path is representative of the worst case critical path to be in operation during a program execution. During on-chip functional operations, a voltage is controlled in response to the attribute, wherein the voltage supplies power to a power domain associated with the plurality of critical paths. The reduction in voltage reduces power drain based on instruction set usage allowing battery life to be extended.

23 Claims, 9 Drawing Sheets

METHOD AND APPARATUS FOR ADAPTIVE VOLTAGE SCALING BASED ON INSTRUCTION USAGE

FIELD OF THE DISCLOSURE

The present disclosure relates generally to the field of power control in integrated circuits and processing systems, and more specifically, to adaptive voltage scaling based on instruction usage.

BACKGROUND

Many portable products, such as cell phones, laptop computers, personal data assistants (PDAs) or the like, utilize a processor executing programs, such as, communication and multimedia programs. The processing system for such products includes a processor complex for processing instructions and data. The functional complexity of such portable products, other personal computers, and the like, requires high performance processors and memory. At the same time, portable products have a limited energy source in the form of batteries and are often required to provide high performance levels at reduced power levels to increase battery life. Many personal computers are also being developed to provide high performance at low power drain to reduce overall energy consumption.

Internal to a processor complex, signal paths and pipeline stages are designed to meet a worst case critical timing path corresponding to a desired clock frequency. Memory elements, logic gates, flip-flops, and wires interconnecting the elements introduce delays in the critical path timing limiting the number of functional elements in a pipeline stage dependent upon the clock frequency. As a consequence, many processors use a large number of pipeline stages to execute instructions of varying complexity and achieve gigahertz (GHz) clock frequencies required to meet a product's functional requirements. Since power is a function of frequency, switching capacitance, and the square of the supply voltage, reducing power requires the reduction of at least one of these three variables. Since gigahertz frequency operation is many times required by a product's functions, reducing frequency is limited to less demanding functions. Switching capacitance is a function of an implementation and the technology process used to manufacture a device and once a design is instantiated in silicon this variable cannot be changed. One consequence of reducing the supply voltage is that as the supply voltage is reduced the logic and memory elements slow down, increasing the difficulty in meeting frequency requirements.

In order to meet a worst case critical timing path in a processor complex, the worst case critical timing paths for all the signal paths within the processor complex are analyzed and the longest path among these becomes the critical timing path that governs the processor complex's highest possible clock frequency. To guarantee that this clock frequency is met, the supply voltage is specified to be greater than or equal to a worst case minimum voltage. For example, it may be determined that when executing a floating point instruction, a signal path through a floating point multiplier may be the longest critical timing path in the processor complex. The power supply voltage is determined such that the worst case timing path through the floating point multiplier meets the desired clock frequency.

Since any instruction may be selected from a processor's instruction set for execution at any time, the processor complex generally operates in preparation for the worst case timing path. As a consequence, power is wasted when executing instructions having a critical timing path less than the worst case timing path. Unfortunately, the supply voltage cannot be easily changed to match the instruction-by-instruction usage of gigahertz processors. Variable voltage regulators require microseconds or milliseconds to adjust a supply voltage.

SUMMARY

The present disclosure recognizes that reducing power requirements in a processor complex is important to portable applications and in general for reducing power use in processing systems. It is also recognized that different software applications may use a set of instructions having critical timing paths less than the worst case critical timing path of the processor complex. Further, it is recognized that a supply voltage may be reduced for such applications while still maintaining the clock frequency necessary to meet the application's performance which reduces power drain based on instruction set usage allowing battery life to be extended.

To such ends, an embodiment of the invention addresses a method for adaptive voltage scaling. A critical path is selected from a plurality of critical paths for analysis on emulation logic to determine an attribute of the selected critical path during on-chip functional operations, wherein the selected critical path is representative of the worst case critical path to be in operation during a program execution. During on-chip functional operations, a voltage is controlled in response to the attribute, wherein the voltage supplies power to a power domain associated with the plurality of critical paths.

Another embodiment addresses an adaptive voltage scaling (AVS) circuit having a timing path emulation circuit, programmable control logic, and a measurement circuit. The timing path emulation circuit emulates critical paths. The programmable control logic configures the programmable timing path emulation circuit to emulate at least one critical path based on instruction usage in a program to be operated on-chip. The emulated critical path is representative of the worst case critical path to be in operation during the program execution. The measurement circuit measures an attribute of the emulated critical path during on-chip functional operations and, in response to the measured attribute, controls an output voltage of a voltage regulator, wherein the voltage regulator supplies power to a power domain associated with the plurality of critical paths.

A further embodiment addresses a method for adaptive voltage scaling. A time delay is set in a programmable path delay circuit to emulate a critical path delay representing the longest critical path associated with a program to be operated on-chip, wherein different programs have different longest critical paths. During on-chip functional operations, a voltage is adjusted based on a measurement of the emulated critical path delay, wherein the voltage supplies power to a power domain associated with the emulated critical path.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
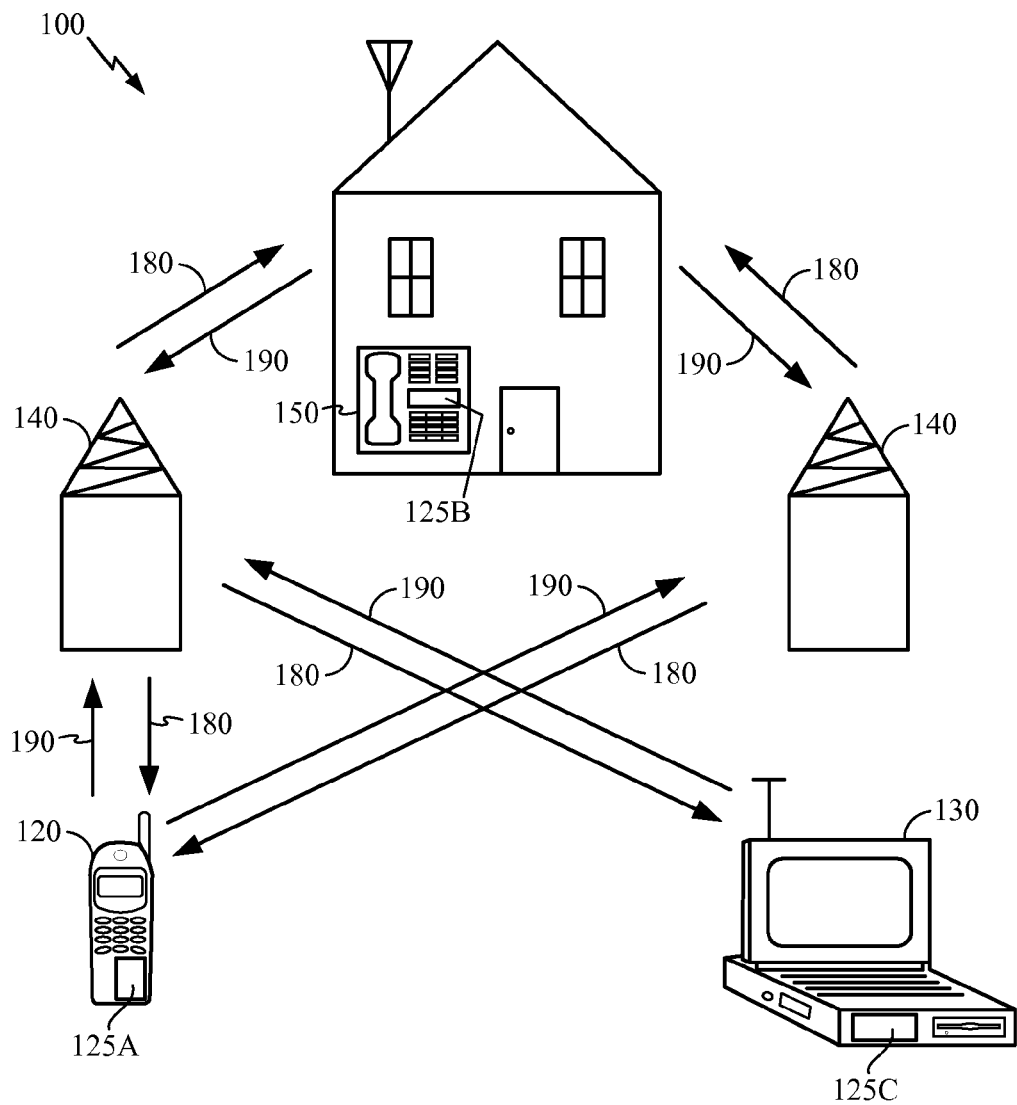
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, and 150 include hardware components, software components, or both as represented by components 125A, 125C, and 125B, respectively, which have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having an adjustable voltage regulator, such as may be used to supply power to a processor and its supporting peripheral devices.

Figure 2:
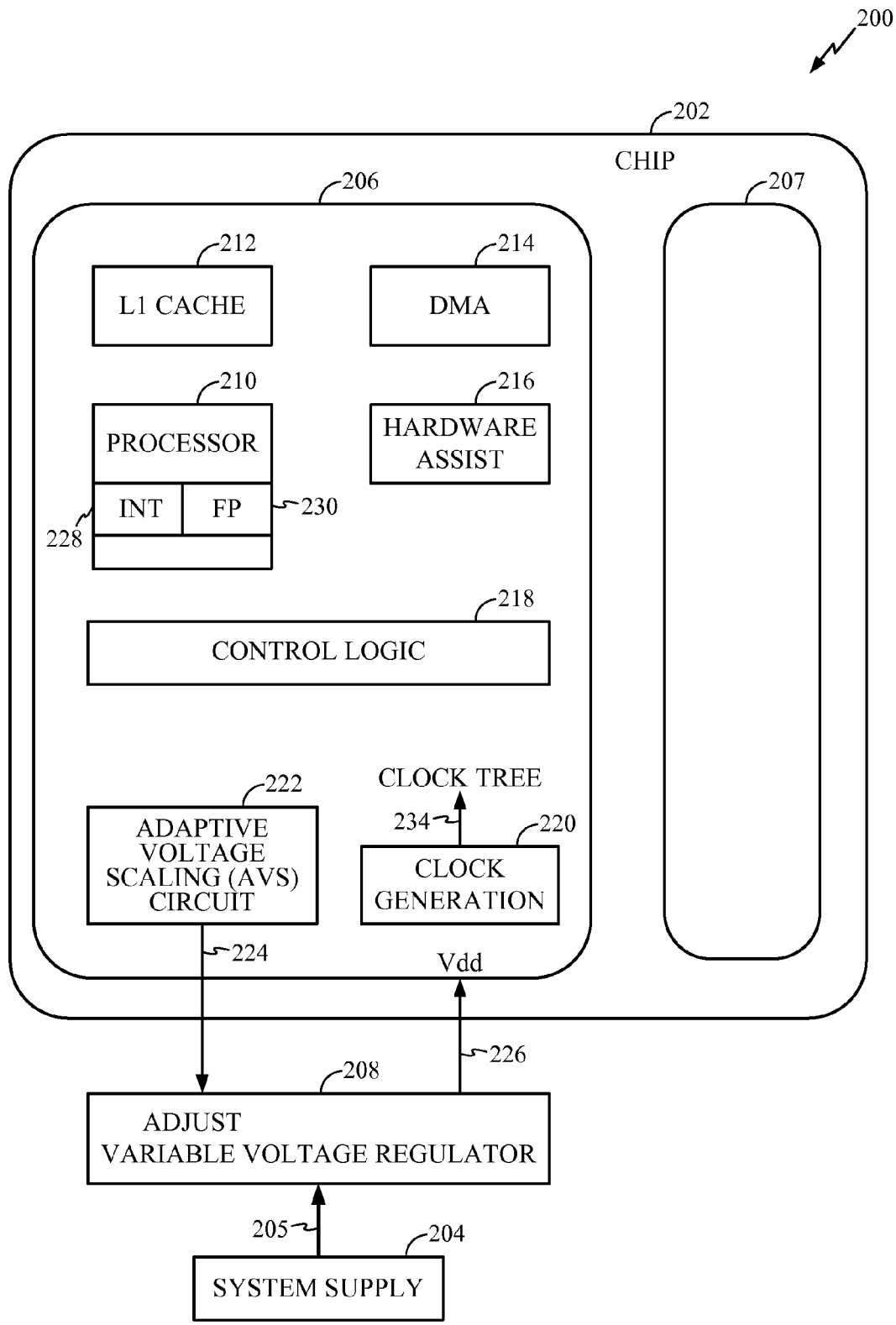
FIG. 2 shows a processing system organization for adaptively saving power based on instruction usage.

FIG. 2 shows a processing system organization 200 for adaptively saving power based on instruction usage. The system 200 comprises a chip 202, a system supply 204, such as a battery or bulk supply voltage, and a variable voltage regulator 208. The chip 202 includes, for example, a first power domain 206 and a second power domain 207. Each power domain contains a subset of logic appropriately grouped for separate power control to meet the power and performance requirements of the system 200. Each power domain may further receive a supply voltage from a separate voltage regulator. For example, the first power domain 206 may contain a processor complex having processor execution pipelines 210, a level 1 cache (L1 Cache) 212, which may suitably comprise an L1 instruction cache and an L1 data cache, a direct memory access (DMA) controller 214, one or more hardware assists 216, control logic 218, a clock generation unit 220, and an adaptive voltage scaling (AVS) circuit 222. The AVS circuit 222 is designed to provide an adjust signal 224 to the variable voltage regulator 208 requesting the voltage Vdd 226 be raised or lowered based on instruction usage of the processor execution pipelines 210.

Instruction usage is categorized by grouping instructions by their critical timing paths. For example, a first category of instructions, may operate with a critical timing path of the processor complex that is used to set the operating frequency of the processor. Such a critical timing path is generally associated with a worst case operating condition of the processor complex having a minimum acceptable operating voltage, highest expected temperature, and worst case process characteristics. At the same worst case operating condition, a second category of instructions may operate with a critical timing path that is less than the critical timing path of the first category of instructions. A third category of instructions may be identified that operate with an associated critical timing path that is less than the second category of instructions, and so on. Thereby, multiple distinct categories of instructions may be identified according to their critical timing path. By static analysis of a program or by monitoring the operating condition and category of instruction usage, the supply voltage for the processor complex in the power domain 206 may be adjusted to ensure the critical timing paths of the instructions meet a specified minimum clock frequency, considering the active or soon to be active categories of instructions. For example, when instruction usage indicates that the instructions in execution or to be executed have a timing margin at the present operating conditions, the voltage may be advantageously lowered to a voltage level appropriate for the corresponding instruction usage, thereby saving power and extending battery life in a mobile device.

As an example, in the processing system organization 200, the processor may contain an integer (Int) unit 228 and a floating point (Fp) unit 230. By static timing analysis, the critical timing path for floating point instructions may be categorized as category one instructions, for example, having the worst case timing path for the logic in the first power domain 206. By further static timing analysis, the critical timing path for integer instructions may be categorized as category two instructions having a worst cast timing path that is less than the category one instructions. With the voltage Vdd 226 set at a high level based on execution of previous floating point instructions, for example, and an indication that the instruction usage has changed to category two, the AVS circuit 222 requests that the voltage Vdd 226 be adjusted lower. Depending upon an adjustment step size, the voltage Vdd 226 may be adjusted lower a number of times until a voltage level is reached appropriate for the category two instructions.

For example, a 65 nanometer (nm) technology may be used to implement the processing system organization 200 and in such technology a 2-input NAND gate may have a worst case delay of 70 picoseconds (ps) driving an average fan-out of four loads at the worst case operating conditions. Such a delay may increase for every drop in voltage. The critical timing path for a floating point execution stage may have ten similar type gates interconnected by relatively long wires between two storage elements having their own delay, set-up and hold requirements, and just meet a 1 nanosecond pipeline stage delay required for a gigahertz clock frequency at the worst case operating conditions.

By comparison, a critical timing path for an integer execution stage may have only five similar type gates interconnected by relatively long wires between two storage elements, and have a critical timing path of 700 picoseconds, well under the 1000 picoseconds of the gigahertz clock frequency at the worst case operating conditions. Consequently, when executing integer type instructions, the voltage Vdd 226 may be appropriately lowered, increasing the critical timing path for the integer instructions up to the 1000 picoseconds stage delay, still meeting the gigahertz clock frequency but with reduced power drain. The operation of the AVS circuit 222 is not dependent upon the number of stages in the processor execution pipelines or the processor clock speed. In general, the voltage can be raised or lowered by programming the AVS system appropriate for a desired frequency corresponding to the critical timing paths expected to be in operation.

Variable voltage regulators, such as variable voltage regulator 208, operate with various voltage step sizes, such as 25 millivolts (mv), as specified by an input signal, such as the adjust signal 224. Each adjustment of 25 millivolts may take, for example, 10 microseconds or longer. Such an adjustment time is taken into account in hardware or software according to the method for adaptive voltage scaling chosen.

Figure 3:
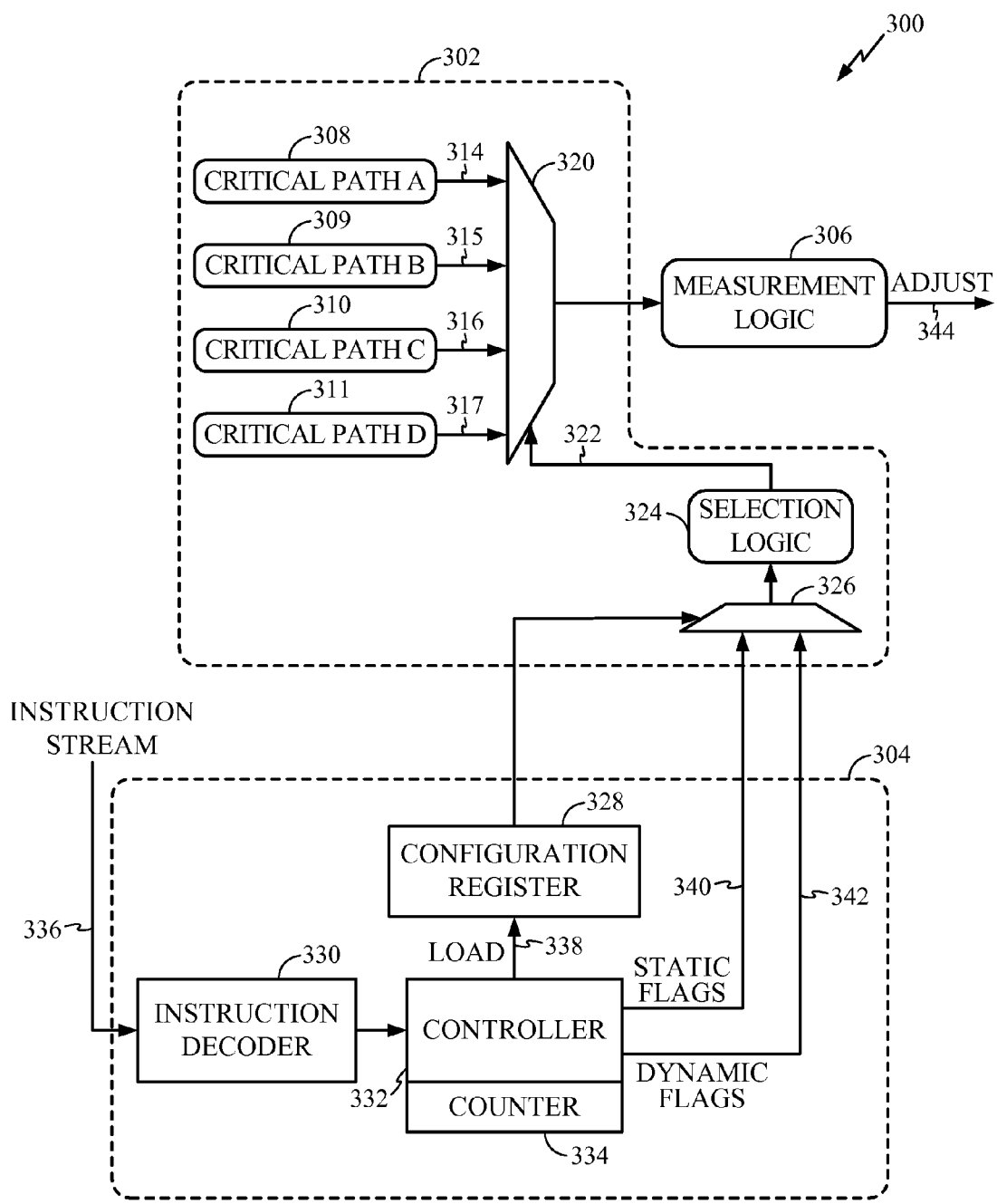
FIG. 3 is an exemplary first embodiment of an adaptive voltage scaling (AVS) circuit.

FIG. 3 is an exemplary first embodiment of an adaptive voltage scaling (AVS) circuit 300. The AVS circuit 300 comprises a critical path selection logic 302, a programmable instruction usage control circuit 304, and measurement logic 306. The critical path selection logic 302 includes, for example, four critical paths A-D 308-311 providing delayed outputs 314-317 to a multiplexer 320. Critical path A 308, for example, is the worst case timing path in the first power domain 206 and is, also for example, associated with execution of floating point instructions. Critical path B 309 has a signal path delay less than critical path A 308 and is, for example, associated with integer instructions. Critical path C 310 has a delay less than critical path B 309 and critical path D 311 has a delay less than critical path C 310.

The multiplexer 320 selects one of the critical paths based on a select signal 322 generated by selection logic 324 based on information from multiplexer 326. The programmable instruction usage control circuit 304 comprises a configuration register 328, an instruction decoder 330, a controller 332 which includes one or more counters 334. The instruction decoder 330 decodes instructions received from an instruction stream 336, such as may be provided by processor execution pipelines 210 of FIG. 2. The decode information is sent to controller 332 where it may be used to load the configuration register 328 via a load path 338 and set static flags 340, such as, compiler directed flags. The controller 332 may also use the decode information to determine dynamic flags 342 associated with dynamically determining instruction usage, for example, by using the counter 334 to count the number of times a particular type of instruction is decoded or the time between decoding instructions of a particular type. The multiplexer 326 selects either the static flags 340 or the dynamic flags 342 based on select bits loaded into the configuration register 328. The measurement logic 306 measures the selected path and generates an adjust signal 344 that is used by the variable voltage regulator 208 of FIG. 2.

In more detail, each of the critical paths 308-311 may be emulated critical paths that use components in their associated signal path that are similar to the actual components used in the critical path they are emulating. In addition, each of the emulated critical paths is placed in close proximity to their associated actual critical path to make the implementation process and temperature conditions experienced by the emulated components similar to the conditions the actual critical path elements encounter. Since the selected actual critical paths and their associated emulated critical paths may be distributed across a chip, the multiplexer 320 and measurement logic 306 may also be suitably distributed across the chip, while still converging to a single adjust signal 344.

The static flags 340 may be set by a compiler that accounts for the adaptive voltage scaling (AVS) circuit by monitoring static instruction usage in a program according to categories of instructions classified by their critical timing paths. For example, in compiling a video processing program, it may be determined that there is a very limited usage of category one instructions, such as, for example, floating point instructions. Based on the limited usage of floating point instructions, the compiler may select to emulate the floating point instructions, thereby removing category one instructions from the compiled video processing program. Based upon such an analysis, the compiler may set the static flags 340 to indicate selection of critical path B 309, for example. Based on the measurement of critical path B 309, adjust signal 344 may indicate the voltage Vdd 226 of FIG. 2, can be lowered.

With the configuration register setting the multiplexer 326 to select the dynamic flags 342, the selection of one of the critical paths A-D 308-311 is determined by hardware usage information. For example, by monitoring the instruction stream 336 based on decoded information from the instruction decoder 330, the controller 332 may determine that a particular instruction type, generally associated with video processing, is occurring frequently and no floating point instructions have been encountered for the last ten thousand instructions. Based on this determination, the controller 332 may set dynamic flags appropriate for the selection of critical path B 309. After such a selection, if a category one instruction is encountered, a stall situation would be enforced and the adjust signal 344 set to indicate the voltage is to be raised to accommodate the category one instruction.

Figure 4:
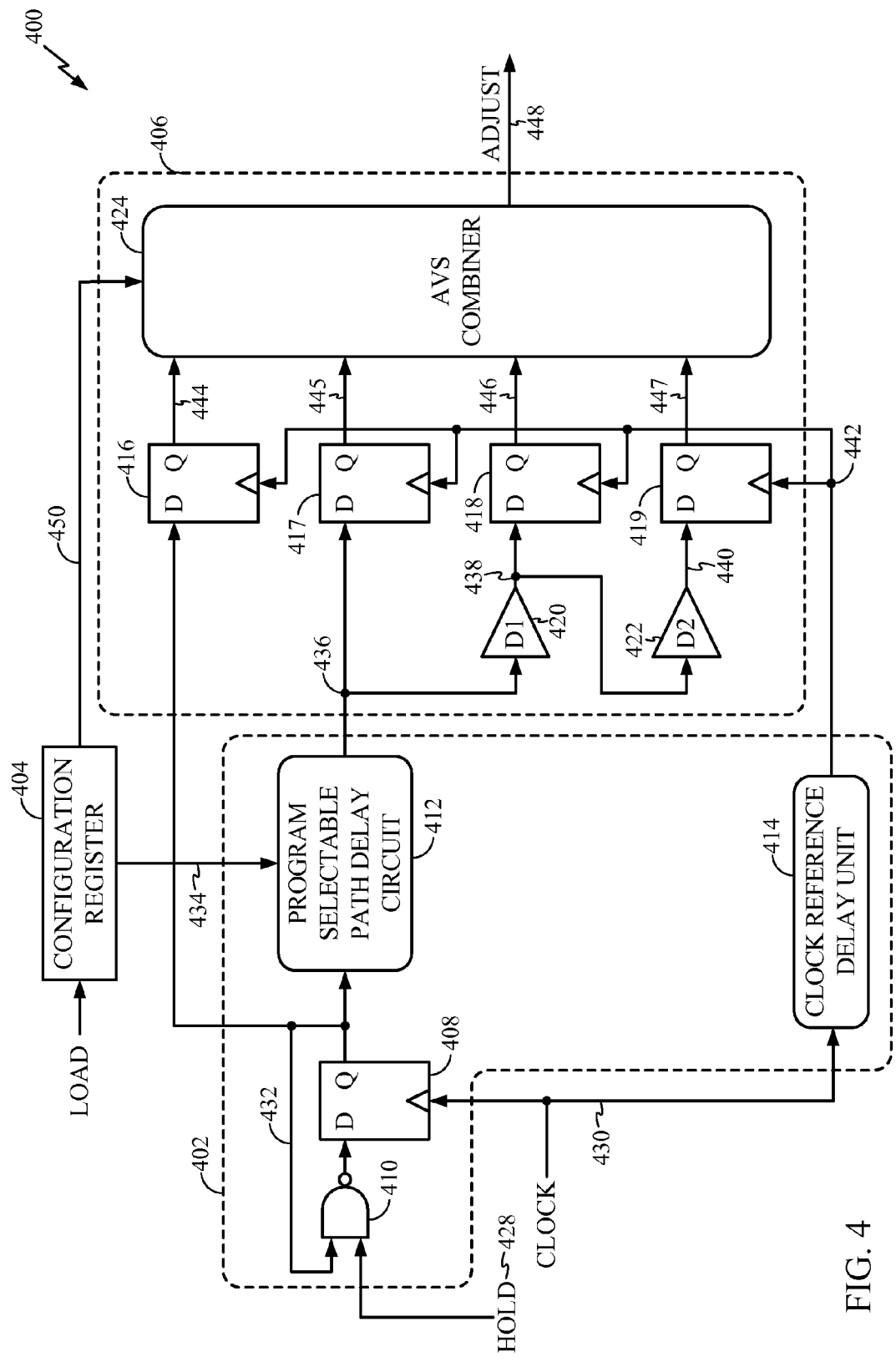
FIG. 4 is an exemplary second embodiment of an adaptive voltage scaling (AVS) circuit.

FIG. 4 shows an exemplary second embodiment of an adaptive voltage scaling (AVS) circuit 400 which may be suitably employed as the AVS circuit 222. The AVS circuit 400 comprises critical path modeling circuit 402, measurement logic 406, and programmable configuration register 404. The critical path modeling circuit 402 includes a flip-flop 408, a NAND gate 410, a program selectable path delay circuit 412, and a clock reference delay unit 414. The measurement logic 406 includes measurement flip-flops (Mflip-flops) 416-419, a first delay element D1 420, a second delay element D2 422, and an AVS combiner 424.

The flip-flop 408 and NAND gate 410 comprise a toggle flip-flop arrangement which when not held by the hold signal 428 and clocked by clock signal 430, toggles the Q output 432 with each rising edge of the clock signal 430. The hold signal 428 at a "1" level enables the measurement process. The Q output 432 is coupled to a data input of the Mflip-flop 416 and to the program selectable path delay circuit 412. The program selectable path delay circuit 412 is configured for emulating a critical path delay based on a select input 434 from the programmable configuration register 404. For example, when the Q output 432 rises to a "1" level, after a programmable delay period, a first delay output 436 from the program selectable path delay circuit 412 is received at a data input of the flip-flop 417 and at an input to the first delay element D1 420. A second delay output 438 of the first delay element D1 420 is coupled to a data input of flip-flop 418 and to an input to the second delay element D2 422. A third delay output 440 of the second delay element D2 422 is coupled to a data input to flip-flop 419.

The clock signal 430 is delayed by the clock reference delay unit 414 to match the delay of the program selectable path delay circuit 412 when it is programmed for "no delay." That is, even if 0 stages of delay are programmed in each and every section of the program selectable path delay circuit 412, there will be some delay just from traversing the multiplexers as described in further detail below with respect to the program selectable path delay circuit 500 of FIG. 5. The clock reference delay unit 414 also includes the launch delay of the flip-flop 408. Then, the arrival time delta between the delayed clock signal 442 and the first delay output 436 represents the delay of the programmed delay elements in the program selectable path delay circuit 412 plus the launch delay of the latch. The delayed clock signal 442 is used to clock each of the Mflip-flops 416-419 transferring the values of their data inputs to corresponding Q outputs 444-447. The Q outputs 444-447 are coupled to the AVS combiner 424 which contains priority encoded logic to determine whether the critical path is being met. By measuring from the rising edge of Q output 432 to the Q outputs 444-447, the critical path is being measured every other clock period.

For example, critical path B 309 of FIG. 3 is emulated by the program selectable path delay circuit 412 by loading appropriate configuration input values associated with the critical path B 309. For this example, the voltage Vdd 226 of FIG. 2 at the start of the delay emulation is at its highest level. If the Q outputs 444-447 are at a "1" level at the end of the delay emulation, then the critical path B 309 as measured from rising edge of Q output 432 to rising edges of Q outputs 444-447 meets the clock frequency period with a timing margin of D1 420 plus D2 422. In this situation, the voltage Vdd 226 would be considered too high and adjust signal 448 would indicate that the voltage Vdd 226 should be lowered. While such lowering of the voltage Vdd 226 is occurring, other operations on the chip may continue as normal. After a period of time required for the variable voltage regulator to reach the new lower voltage level, the timing of the modeled critical path B 309 may be redone. If the Q outputs 444-447 are still at a "1" level at the end of a delay emulation, the voltage would be lowered again. If, the Q outputs 444-446 are at a "1" level and the flip-flop 419 Q output 447 is at a "0" level, then the critical path B 309 makes its timing with a timing margin of D1 420. At this point, adequate timing margin may be considered to be present and no further adjustment to the voltage Vdd 226 is made. Alternatively, if the program selectable path delay circuit 412 included additional timing margin within its delay setting, then the timing margin of D1 may still be excessive and the voltage Vdd 226 may be adjusted to a lower voltage.

With a timing margin of D1 420 plus D2 422, a larger step size for adjusting the supply voltage may be made as compared to the step size used when only a margin of D1 is detected. Falling edge to falling edge signal timing may also be measured with the AVS circuit 400. The Mflip-flop 416 is provided as an indication that a delay emulation was executed and if none of the other Mflip-flops 417-419 are set then no timing margin exists or an error situation has been encountered. It is also noted that by use of a forced adjustment signal 450, an adjustment may be forced to occur based on events occurring other than the measurement of emulated critical timing paths, such as may occur when processing an interrupt routine requiring the use of a category one instruction.

Figure 5:
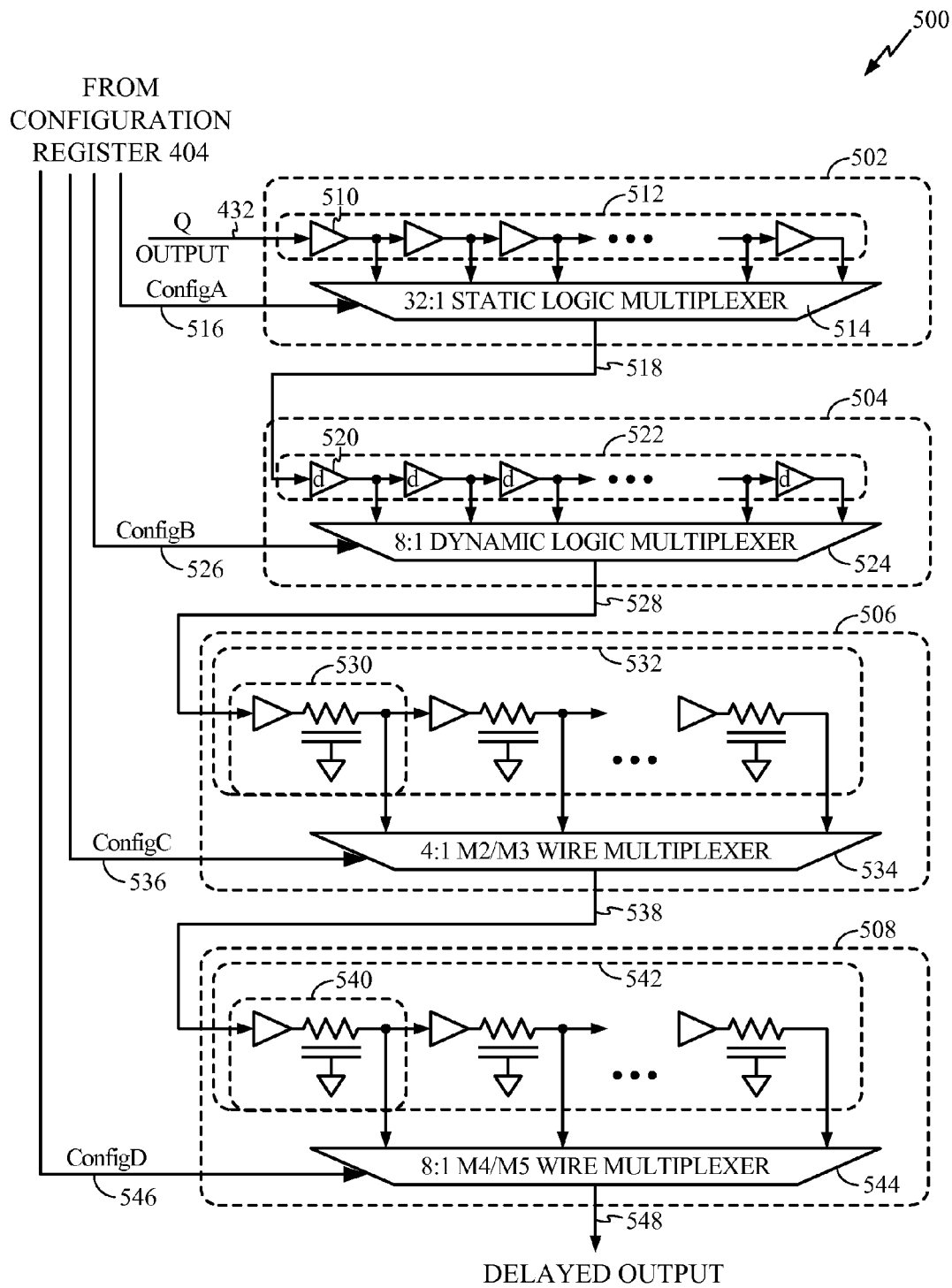
FIG. 5 illustrates an exemplary program selectable path delay circuit.

FIG. 5 is an exemplary program selectable path delay circuit 500 which may be suitably employed as program selectable path delay circuit 412. A critical timing path may be emulated as a path through a static logic circuit 502, a dynamic logic circuit 504, models of interconnection wiring delays on different silicon layers, such as, a metal levels 2 and 3 (M2/M3) circuit 506, and a metal levels 4 and 5 (M4/M5) circuit 508. In reference to FIG. 4, the program selectable path delay circuit 412 comprises the static logic circuit 502, the dynamic logic circuit 504, the metal levels M2/M3 circuit 506, and the metal levels M4/M5 circuit 508.

To emulate a circuit's static logic, a static logic buffer 510, with a minimum delay such as 20 picoseconds for example, is replicated in a serial chain of 32 buffers 512 which is tapped off at each buffer position and coupled to a 32 to 1 multiplexer 514. The programmable configuration register 404 of FIG. 4 couples select configuration A (ConfigA) signals 516 to the 32 to 1 multiplexer 514 to programmably select delays from 20 picoseconds up to a maximum of 640 picoseconds in 20 picosecond delay intervals on the output 518.

To emulate a circuit's dynamic logic, a dynamic logic buffer 520, with a minimum delay of 15 picoseconds for example, is replicated in a serial chain of eight dynamic logic buffers 522 which is tapped off at each dynamic buffer position and coupled to an 8 to 1 multiplexer 524. The programmable configuration register 404 couples select configuration B (ConfigB) signals 526 to the 8 to 1 multiplexer 524 to programmably select delays from 15 picoseconds up to 120 picoseconds in 15 picosecond delay intervals on the output 528.

To emulate a circuit's wire delays for metal layers M2/M3, a buffer resistor capacitor (RC) circuit 530 is used with a time constant delay, for example 8 picoseconds, chosen to match a minimum expected wire delay for the wiring levels M2 and M3. The RC circuit 530 is replicated in a serial chain of, for example, four RC circuits 532 which is tapped off at each RC circuit position and coupled to a 4 to 1 multiplexer 534. The programmable configuration register 404 couples select configuration C (ConfigC) signals 536 to the 4 to 1 multiplexer 534 to programmably select delays from 8 picoseconds up to 32 picoseconds in 8 picosecond intervals on the output 538.

To emulate a circuit's wire delays for metal layers M4/M5, a buffer resistor capacitor (RC) circuit 540 is used with a time constant delay, for example 9 picoseconds, chosen to match a minimum expected wire delay for the wiring levels M4 and M5. The RC circuit 540 is replicated in a serial chain of, for example, eight RC circuits 542 which is tapped off at each RC circuit position and coupled to an 8 to 1 multiplexer 544. The programmable configuration register 404 couples select configuration D (ConfigD) signals 546 to the 8 to 1 multiplexer 544 to programmably select delays from 9 picoseconds up to 72 picoseconds in 9 picosecond intervals on the output 548.

The program selectable path delay circuit 412 may be implemented with more or less emulated functions depending upon the implementation technology and critical timing paths being emulated. For example, with implementation and technology that does not use dynamic logic, the dynamic logic circuit 504 would not be required. In a further example, two more wiring metal layers M6 and M7 may be used in an implementation having a different delay model than the other wiring levels and requiring a metal layer M6/M7 circuit be developed that models the timing delay for signals that travel the M6 and M7 layers.

Figure 6A:
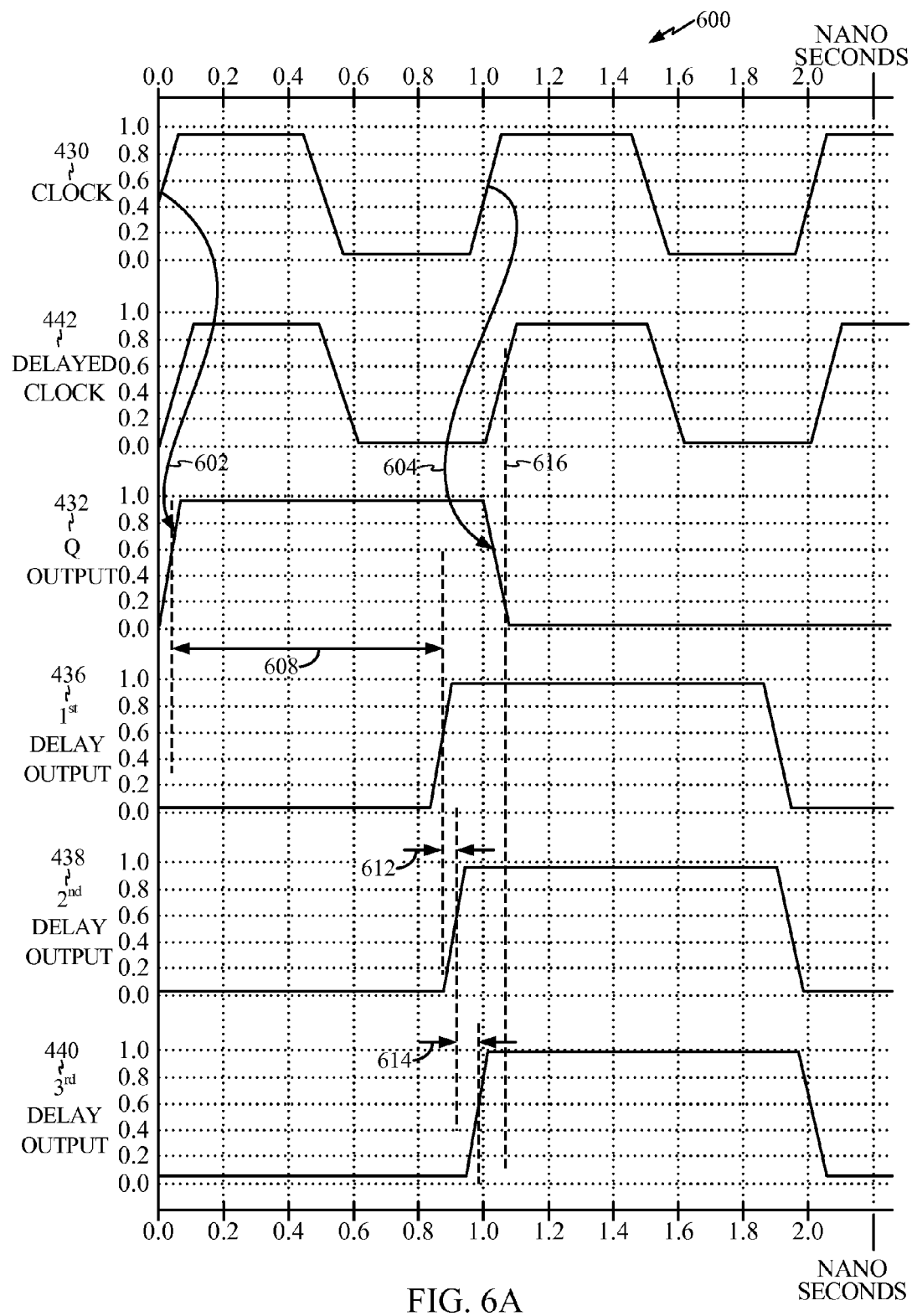
FIGS. 6A and 6B illustrate timing diagrams for operation of an adaptive voltage scaling combiner included in the second embodiment of the adaptive voltage scaling circuit of FIG. 4.
Figure 6B:
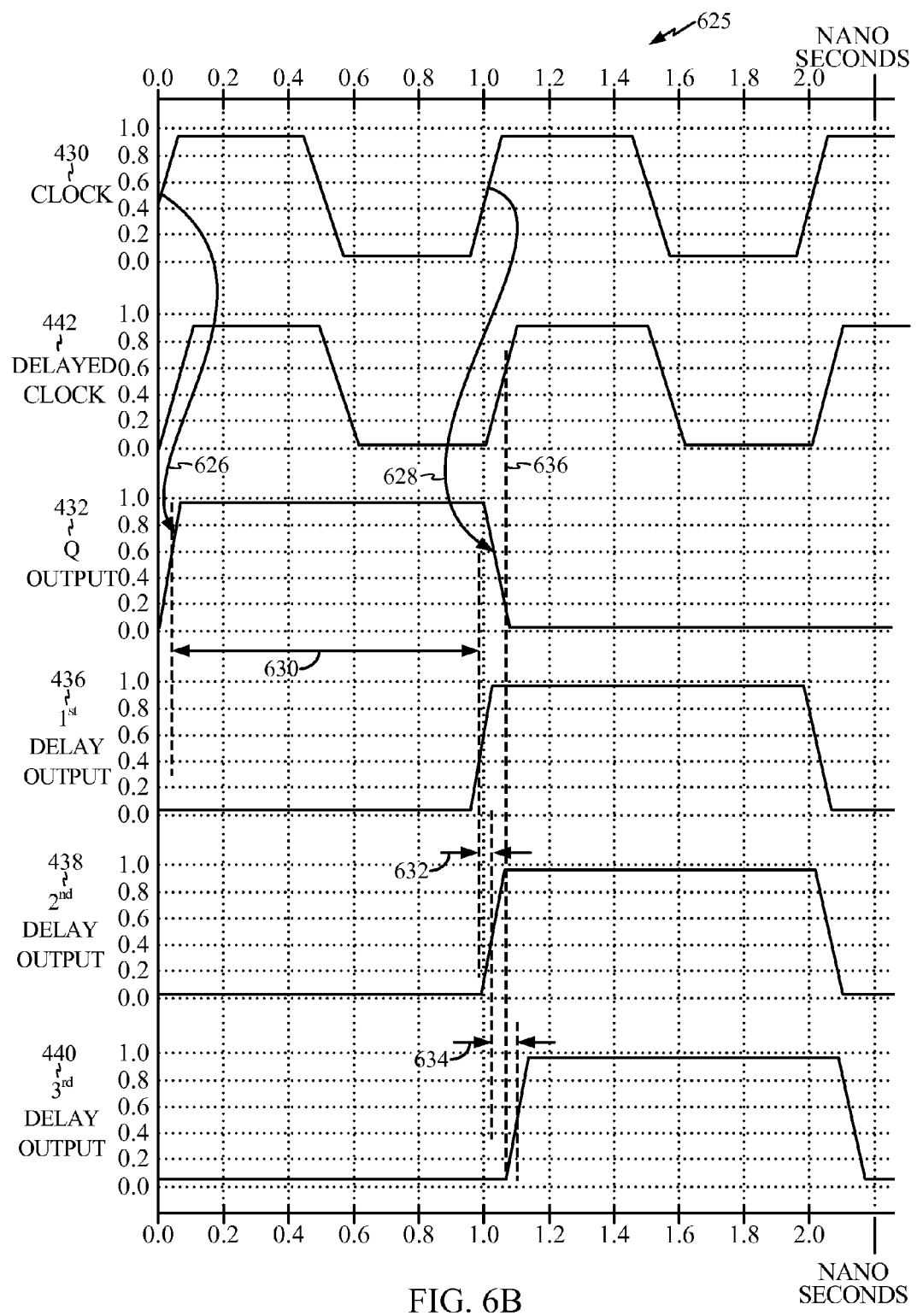

FIGS. 6A and 6B illustrate timing diagrams 600 and 625, respectively, for operation of the adaptive voltage scaling combiner 424 included in the second embodiment of the adaptive voltage scaling circuit 400 of FIG. 4. Exemplary relationships between the timing events of FIGS. 6A and 6B and the elements of FIG. 4 are indicated by referring to exemplary elements from the AVS circuit 400 which may suitably be employed to carry out the timing events of FIGS. 6A and 6B. A timing event is considered to occur when a signal transition crosses the logic threshold of a device used in an implementation technology.

The circuits described herein are assumed to respond to input signals at a 30% above a ground level or 30% of a supply voltage level. For example, a "0" value would be considered anything less than or equal to 0.3 volts and a "1" value would be considered anything greater than or equal to 0.7 volts for a supply voltage of 1.0 volts. Depending upon technology, a different supply voltage may be used and a response tolerance different than 30% may also be used. For the timing diagram 600 a supply voltage of 1 volt is assumed. It is noted that the rising and falling edges of the clock 430, delayed clock 442, and other signals may vary with voltage, process technology, and other factors such as signal loading. These variations may be accounted for by appropriate signal analysis techniques such as the use of analog circuit simulation techniques.

In FIG. 6A, at timing event 602, the rising edge of clock 430 causes the Q output 432 of the flip-flop 408 to transition to a high level. At timing event 604, the rising edge of the clock 430 causes the Q output 432 of the flip-flop 408 to transition to a low level. The Q output 432 flows through the program selectable path delay circuit 412 generating the first delay output 436 with a delay 608. The second delay output 438 follows after a delay D1 612 and the third delay output 440 follows after a delay D2 614. The Mflip-flops 416-419 are clocked by delayed clock 442 at timing event 616. In this example, the Q outputs 444-447 are all at a "1" level at timing event 616 indicating that the voltage Vdd 226 of FIG. 2 may be lowered. Once the voltage has been lowered to the desired voltage, the delay path is remeasured since all the delays will have increased due to the lower voltage. Depending upon the number of Mflip-flops 416-419 that are asserted further adjustments to the voltage Vdd may be made. It is appreciated that circuit analysis techniques are used, for example, to ensure correct operation within best-case to worst-case timing scenarios for a particular implementation.

In FIG. 6B, the voltage Vdd 226 has been lowered and the delay of the emulated critical timing path has increased. The Q output 432 flows through the program selectable path delay circuit 412 generating the first delay output 436 but now with a delay 630. The second delay output 438 follows after a delay D1 632 and the third delay output 440 follows after a delay D2 634. The Mflip-flops 416-419 are clocked by delayed clock 442 at timing event 636. In this example, three Q outputs 444-446 are at a "1" level and Q output 447 is at a "0" level at timing event 636 indicating that there still is adequate timing margin and no further downward adjustment of the voltage Vdd 226 should be performed.

Figure 7:
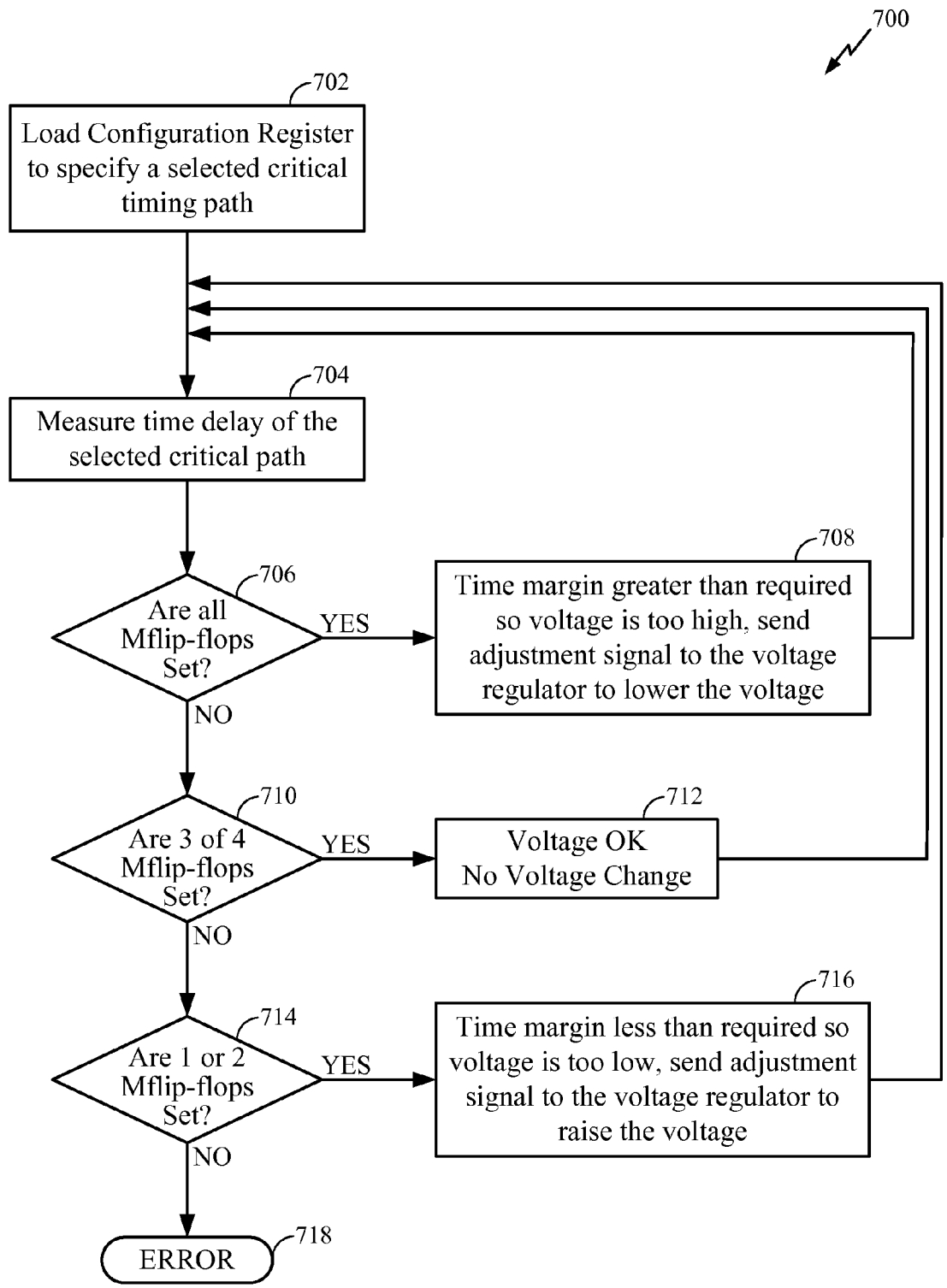
FIG. 7 shows a process for adjusting a voltage regulator based on instruction usage by determining a time margin associated with an instruction critical path delay.

FIG. 7 shows a proces 700 for adjusting a voltage regulator based on instruction usage by determining a time margin associated with an instruction critical path delay. The process 700 starts at block 702 with the loading of the programmable configuration register for a selected critical path. The selected critical path is determined from the instruction usage in a compiled program. At block 704, the time delay of the selected critical timing path is measured. Such measurement, for example, is done by checking the status of the Mflip-flops 416-419. The checking of the Mflip-flops 416-419 may be done at any time since the AVS circuits 300 and 400 operate every clock period while other on-chip functional operations are in process unless AVS is specifically disabled. At block 706, a determination is made whether all measurement flip-flops (Mflip-flop) are set. If all Mflip-flops are set, the process 700 proceeds to block 708. At block 708, the time margin is greater than required so the voltage is considered too high and an adjustment signal is sent to the voltage regulator to lower the voltage. Block 708 is comparable to timing event 616 of FIG. 6A. After the voltage is adjusted, the process 700 returns to block 704 and the measurement is repeated.

Returning to block 706, if all the Mflip-flops are not set, the process 700 proceeds to block 710. At block 710, a determination is made whether three of the four Mflip-flops are set. If three of the four Mflip-flops are set, the process 700 proceeds to block 712. At block 712, the voltage is considered acceptable and no voltage adjustment is done. Block 712 is comparable to timing event 636 of FIG. 6B. The process 700 returns to block 704 and the measurement is repeated.

Returning to block 710, if three of the four Mflip-flops are not set, the process proceeds to block 714. At block 714, a determination is made whether one or two Mflip-flops are set. If one or two Mflip-flops are set, the process proceeds to block 716. At block 716, the time margin is less than required so the voltage is considered too low and an adjustment signal is sent to the voltage regulator to raise the voltage. After the voltage is adjusted, the process 700 returns to block 704 and the measurement is repeated. Returning to block 714, if one or two Mflip-flops are not set, the process proceeds to block 718 where an error condition is indicated.

Figure 8:
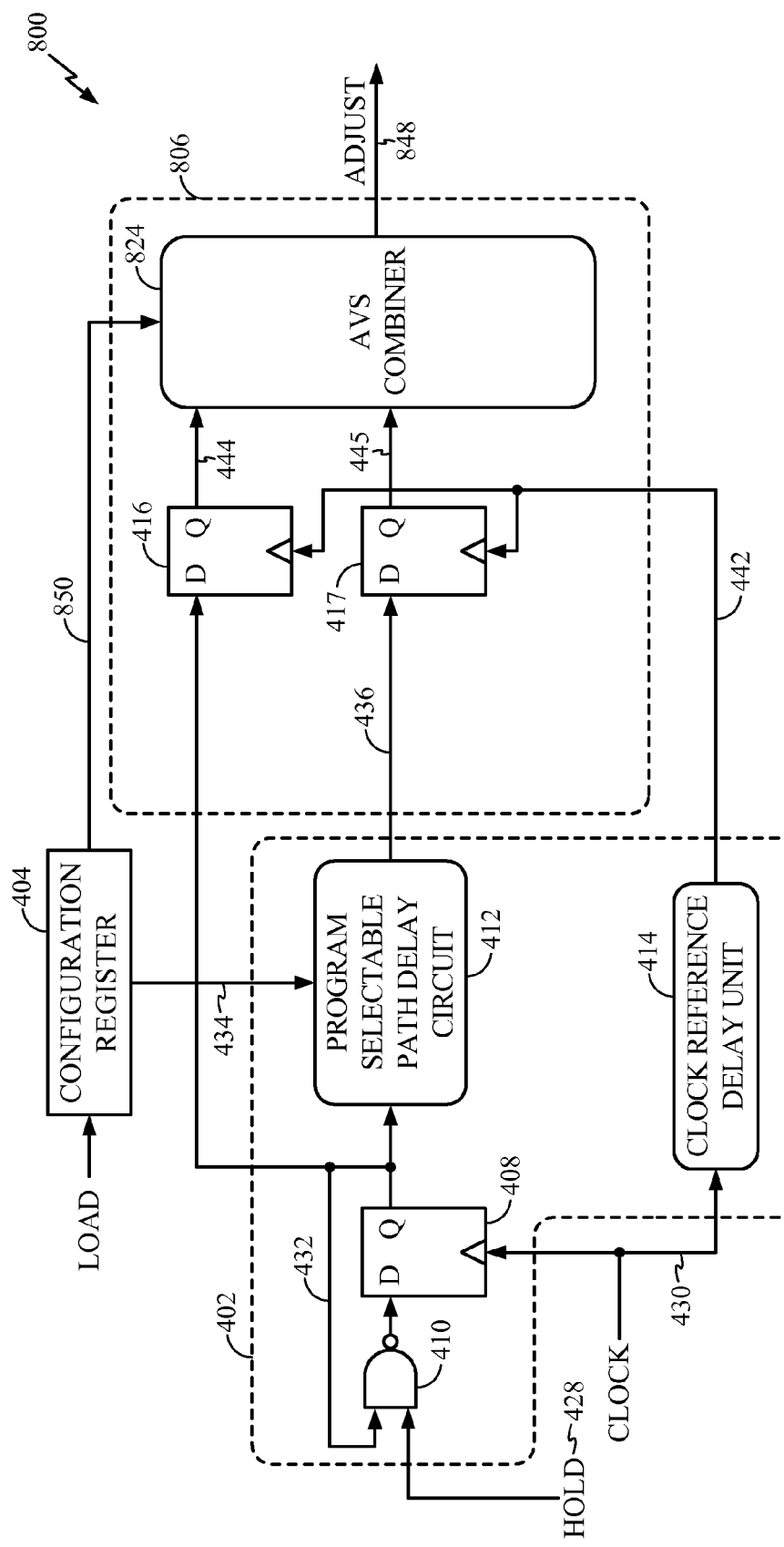
FIG. 8 is an exemplary third embodiment of an adaptive voltage scaling (AVS) circuit.

FIG. 8 shows an exemplary third embodiment of an adaptive voltage scaling (AVS) circuit 800. The AVS circuit 800 comprises the critical path modeling circuit 402, the programmable configuration register 404, and a measurement logic circuit 806. The critical path modeling circuit 402 includes the flip-flop 408, the NAND gate 410, the program selectable path delay circuit 412, and the clock reference delay unit 414. Measurement logic 806 includes the measurement flip-flops (Mflip-flops) 416 and 417 and an AVS combiner 824.

The flip-flop 408 and NAND gate 410 comprise a toggle flip-flop arrangement which when not held by the hold signal 428 and clocked by clock signal 430, toggles the Q output 432 with each rising edge of the clock signal 430. The hold signal 428 at a "1" level enables the measurement process. The Q output 432 is coupled to the data input of the Mflip-flop 416 and to the program selectable path delay circuit 412. The program selectable path delay circuit 412 is configured for emulating a critical path delay plus additional programmed delays D1 and D2 based on the select input 434 from the programmable configuration register 404. For example, when the Q output 432 rises to a "1" level, after the specified programmable delay period, a first delay output 436 from the program selectable path delay circuit 412 is received at a data input of the flip-flop 417. The clock signal 430 is delayed by the clock reference delay unit 414 to account for delays of clock distribution such as occurs with a clock tree, like clock tree 234 of FIG. 2. The delayed clock signal 442 is used to clock each of the Mflip-flops 416 and 417 transferring the values of their data inputs to corresponding Q outputs 444 and 445. The Q outputs 444 and 445 are coupled to an AVS combiner 824 which contains priority encoded logic to determine whether the critical path is being met.

For example, the delay of the critical path B 309 of FIG. 3 plus an additional programmed delay values of D1 plus D2 is emulated by the program selectable path delay circuit 412 by loading appropriate configuration input values. The programmed delay values of D1 and D2 may change depending on the critical path or depending on process or temperature variations encountered in the chip's operating condition. With the critical path lengthened by programmed delays D1 plus D2, the two flip-flops, Mflip-flop 416 and Mflip-flop 417 are used to determine whether the time delay margin is such that the voltage can be lowered, kept the same, or raised.

For this example, the voltage Vdd 226 of FIG. 2 is at its highest level. If the Q outputs 444 and 445 are at a "1" level at the end of an emulation delay, then the critical path B 309 as measured from rising edge of Q output 432 to rising edge Q outputs 444 and 445 meets the clock frequency period with a timing margin of D1 plus D2. In this situation, the voltage Vdd 226 would be considered too high and the adjust signal 848 would indicate that the voltage Vdd 226 should be lowered. While such lowering of the voltage Vdd 226 is occurring, other operations on the chip may continue as normal. After a period of time required for the variable voltage regulator to reach the new lower voltage level, the timing of the modeled critical path may be redone. If the Q outputs 444 and 445 are still at a "1" level, the voltage would be lowered again.

If, the Q outputs 444 and 445 are not both at a "1" level, the delay of the critical path B 309 plus programmed delays D1 plus D2 did not meets the clock frequency period. To determine whether there is a sufficient timing margin for critical path B 309, the configuration register is loaded with a delay model for critical path B 309 delay plus D1 and the timing of the emulated path checked again. If both Mflip-flops 416 and 417 are set, then adequate timing margin is present and no further adjustment to the voltage Vdd 226 is made. If both of the Mflip-flops are not set, the critical path B 309 plus programmed delay D1 did not make its timing, indicating the timing margin may be insufficient for the category two instructions. In this later situation, the adjust signal 848 would indicate the voltage Vdd should be raised.

Falling edge to falling edge signal timing may also be measured with the AVS circuit 800. It is also noted that an adjustment signal 850 may convey information as to the type of delay being measured. For example, with a single adjustment signal 850 set to a "1" level, the combiner 824 would consider the Q output 417 being set to a "1" as indicating a critical path delay plus programmable delays D1 plus D2 is meeting timing with excessive time margin and the voltage may be lowered. The voltage is lowered until the Q output 417 at the end of a delay emulation is a "0". Then the programmable configuration register 404 is loaded with critical path delay plus programmable delay D1 and the adjustment signal 850 is set to a "0" indicating a second measurement with reduced time margin is being tested. The combiner 824 would interpret a Q output 417 of "1" and adjustment signal 850 of "0" as indicating an appropriate margin is present and the voltage regulator is not adjusted. Alternatively, the combiner would interpret a Q output 417 of "0" and adjustment signal 850 also of "0" as indicating the time margin is too small and the voltage needs to be raised. Upon changing to a new critical path emulation measurement with the loading of new configuration bits the adjustment signal may be set depending on the present operation condition of the processor and the newly selected critical path to be measured.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of an instruction set architecture for a processing system, it will be recognized that a wide variety of implementations, such as adjusting voltage according to categories of functions executed on hardware assist co-processing units may be employed using the techniques of the invention by persons of ordinary skill in the art consistent with the above discussion and the claims which follow below.

What is claimed is:

1. A method for adaptive voltage scaling within a processor, the method comprising:
   selecting a second class critical path associated with a second class of instructions of a program of the processor from a plurality of critical paths for analysis on an emulation circuit set up to emulate the selected second class critical path, wherein a first class of instructions previously executed by the processor at a first voltage and a first frequency before the program changed instruction usage on the processor to the second class instructions;
   starting a measurement period to measure a delay of a start signal through the emulation circuit and a measurement circuit having a tapped delay line with stored tap outputs during on-chip functional operations of the processor, wherein the selected second class critical path is representative of a worst case critical path through a second class instruction pipeline stage within the processor to be in operation during execution of the program and wherein the measured delay of the emulated selected second class critical path is less than a first class critical path delay associated with the first class instructions; and
   lowering the first voltage to a second voltage by a control circuit in response to the stored tap outputs during on-chip functional operations, wherein the second voltage powers the selected second class critical path and the second class instructions are executed by the processor at the second voltage and the first frequency.

2. The method of claim 1 further comprising:
   classifying instructions into a plurality of classes of instruction having instruction timing categories according to critical path length between storage elements in the instruction pipeline stage; and
   determining the instruction timing categories used in the program.

3. The method of claim 2 wherein a critical path is dynamically selected based on hardware determined usage of the timing categories used in the program.

4. The method of claim 1 further comprising:
   determining a time margin of the selected critical path from the stored tap outputs as compared to a period of an operating frequency of the power domain.

5. The method of claim 4 further comprising:
making no adjustment to the voltage if the time margin is greater than or equal to a first delay value but less than the first delay value plus a second delay value.

6. The method of claim 5 further comprising:
adjusting the voltage to a lower voltage if the time margin is greater than or equal to the first delay value plus the second delay value.

7. The method of claim 5 further comprising:
increasing the voltage if the time margin is less than the first delay value.

8. The method of claim 1 wherein each critical path of the plurality of critical paths is emulated by instantiating equivalent components in a signal path placed close to the corresponding critical path.

9. The method of claim 1 wherein the emulation circuit is a programmable delay circuit.

10. The method of claim 9 further comprising:
loading a configuration register to select the critical path with configuration bits that configure the programmable delay circuit to model the selected critical path.

11. An adaptive voltage scaling (AVS) circuit comprising:
a programmable timing path emulation circuit for emulating critical paths;
programmable control logic for configuring the programmable timing path emulation circuit to emulate a first critical path for first class instructions used in a first program to be operated in an on-chip processor or to emulate a second critical path for second class instructions used in a second program to be operated in the on-chip processor, wherein the emulated first critical path is representative of a worst case first critical path delay at a first voltage for the first class instructions through a first pipeline stage to be in operation in the on-chip processor during the first program execution and the emulated second critical path is representative of a worst case second critical path delay at the first voltage for the second class instructions through a second pipeline stage to be in operation in the on-chip processor during the second program execution and wherein the worst case second critical path delay is less than the worst case first critical path delay;
path selection logic for selecting the emulated second critical path as a selected emulated critical path based on monitoring an instruction stream of the on-chip processor to dynamically determine usage of the first class instructions and usage of the second class instructions over a monitoring period of time that no first class instructions were recorded and the second class instructions were indicated to have high usage in the instruction stream of the on-chip processor; and
a measurement circuit for starting a measurement period to measure an elapsed delay at the end of the measurement period of a start signal through the selected emulated critical path including additional delay elements during the on-chip processor functional operations and, in response to the measured elapsed delay, controlling an output voltage of a voltage regulator to a second voltage lower than the first voltage, wherein the voltage regulator supplies power to a power domain having the emulated critical path and the additional delay elements represent time margin delays.

12. The AVS circuit of claim 11 wherein the programmable timing path emulation circuit comprises:
a program selectable path delay circuit; and
a starting signal circuit for generating the start signal and initiating the measurement period.

13. The AVS circuit of claim 12 wherein the program selectable path delay circuit comprises:
a first layer of delay elements coupled together in a first layer serial chain with program selectable first layer taps to model logic elements in a critical path, the first layer receiving the starting signal at a first delay element of the first layer serial chain and generating a first layer output from a selected first layer tap; and
a second layer of selectable resistor capacitor (RC) delay elements coupled together in a second layer serial chain with program selectable second layer taps to model interconnection wiring between the logic elements, the first layer output coupled to a first RC delay element of the second layer serial chain and generating a second layer output from a selected second layer selected tap.

14. The AVS circuit of claim 11 wherein the programmable control logic comprises:
a configuration register loaded under program control with configuration bits, wherein the configuration bits configure the programmable timing path emulation circuit to emulate the first critical path or the second critical path.

15. The AVS circuit of claim 11 wherein the measurement circuit comprises:
a first flip-flop receiving an output value of the start signal and transferring the received output value to a first flip-flop output upon being clocked by a clock signal;
a second flip-flop receiving an output value of the critical path emulation circuit and transferring the received output value to a second flip-flop output upon being clocked by the clock signal; and
a combiner receiving the first flip-flop output, the second flip-flop output, and generating an adjustment signal to indicate whether the voltage is to be lowered, kept the same, or raised.

16. The AVS circuit of claim 11 further comprising:
a control circuit upon determining a first class instruction has been detected in the instruction stream, enforcing a stall situation and setting an adjust signal to indicate the second voltage is to be raised to the first voltage after which the stall situation is removed.

17. A method for adaptive voltage scaling within an on-chip processor comprising:
setting a time delay in a programmable path delay circuit to emulate a critical path delay representing a longest critical path for an instruction through one or more on-chip circuits in a pipeline stage associated with instructions of a program to be executed by the on-chip processor, wherein different programs have different instructions with different longest critical paths;
starting a measurement period to measure a delay of a start signal through the programmable path delay circuit set with the time delay for the instruction and a measurement circuit having multiple stored outputs of increasing timing delay steps representing a stored time margin;
adjusting, by a control circuit during functional operations in the on-chip processor, a voltage based on the stored time margin according to the multiple stored outputs of the measurement circuit, wherein the voltage supplies power to a power domain having the emulated critical path in the on-chip processor.

18. The method of claim 17 further comprises:
determining a time margin of the emulated critical path delay as compared to a period of an operating frequency of the on-chip processing system.

19. The method of claim 17 further comprises:
asserting an adjustment signal to an adjustment-required state to indicate that the time delay includes the critical path delay plus an excessive time margin; and
reducing the voltage based on the asserted adjustment signal.

20. The method of claim 17 further comprises:
setting an adjustment signal to a no-adjustment state to indicate that the time delay includes the critical path delay plus a safe operating time margin.

21. The method of claim 17 further comprises:
generating a processor stall request when an instruction is detected that requires a higher operating voltage than the operating voltage presently in use;
adjusting the operating voltage to the higher operating voltage; and
removing the processor stall request upon reaching the higher operating voltage.

22. A method for adaptive voltage scaling within a processor, the method comprising:
means for selecting a second class critical path associated with a second class of instructions of a program of the processor from a plurality of critical paths for analysis on an emulation circuit set up to emulate the selected second class critical path, wherein a first class of instructions previously executed by the processor at a first voltage and a first frequency before the program changed instruction usage on the processor to the second class instructions;
means for starting a measurement period to measure a delay of a start signal through the emulation circuit and a measurement circuit having a tapped delay line with stored tap outputs during on-chip functional operations of the processor, wherein the selected second class critical path is representative of a worst case critical path through a second class instruction pipeline stage within the processor to be in operation during execution of the program and wherein the measured delay of the emulated selected second class critical path is less than a first class critical path delay associated with the first class instructions; and
means for lowering the first voltage to a second voltage by a control circuit in response to the stored tap outputs during on-chip functional operations, wherein the second voltage powers the selected second class critical path and the second class instructions are executed by the processor at the second voltage and the first frequency.

23. A method for adaptive voltage scaling within an on-chip processor comprising:
means for setting a time delay in a programmable path delay circuit to emulate a critical path delay representing a longest critical path for an instruction through one or more on-chip circuits in a pipeline stage associated with instructions of a program to be executed by the on-chip processor, wherein different programs have different instructions with different longest critical paths;
means for starting a measurement period to measure a delay of a start signal through the programmable path delay circuit set with the time delay for the instruction and a measurement circuit having multiple stored outputs of increasing timing delay steps representing a stored time margin;
means for adjusting, during functional operations in the on-chip processor, a voltage based on the stored time margin according to the multiple stored outputs of the measurement circuit, wherein the voltage supplies power to a power domain having the emulated critical path in the on-chip processor.

* * * * *